(12) United States Patent
Brooks et al.

(10) Patent No.: US 11,212,857 B2
(45) Date of Patent: Dec. 28, 2021

(54) PREDICTIVE BEARER ASSIGNMENT FOR WIRELESS NETWORKS

(71) Applicant: T-Mobile USA, Inc., Bellevue, WA (US)

(72) Inventors: Terri L. Brooks, Prosper, TX (US); John J. Humbert, Roeland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 25 days.

(21) Appl. No.: 16/389,655

(22) Filed: Apr. 19, 2019

(65) Prior Publication Data

US 2020/0337101 A1 Oct. 22, 2020

(51) Int. Cl.
| | |
|---|---|
| *H04W 76/15* | (2018.01) |
| *H04L 12/24* | (2006.01) |
| *H04W 24/02* | (2009.01) |
| *H04W 48/16* | (2009.01) |
| *H04W 48/18* | (2009.01) |

(Continued)

(52) U.S. Cl.
CPC ............ *H04W 76/15* (2018.02); *H04L 41/16* (2013.01); *H04W 24/02* (2013.01); *H04W 48/16* (2013.01); *H04W 48/18* (2013.01); *H04W 48/20* (2013.01); *H04W 64/00* (2013.01)

(58) Field of Classification Search
CPC ..... H04W 64/00; H04W 48/16; H04W 24/02; H04W 76/15; H04W 48/18; H04W 48/20; H04W 28/0252; H04L 41/16; H04L 5/001; H04L 5/0035
See application file for complete search history.

(56) References Cited

U.S. PATENT DOCUMENTS

| | | | |
|---|---|---|---|
| 10,353,764 B1 * | 7/2019 | Cazzanti | ............... G06N 7/005 |
| 2006/0193295 A1 * | 8/2006 | White | ............... H04L 12/5692 370/336 |

(Continued)

FOREIGN PATENT DOCUMENTS

WO WO2018074954 A1 4/2018

OTHER PUBLICATIONS

The Extended European Search Report dated Sep. 7, 2020 for European Patent Application No. 20168267.1, 10 pages.

(Continued)

*Primary Examiner* — Ricardo H Castaneyra
(74) *Attorney, Agent, or Firm* — Lee & Hayes, P.C.

(57) ABSTRACT

Predictive bearer assignment for wireless networks is described herein. A wireless network can include a first base station and a second base station to provide dual connectivity to user equipments (UEs) operating in an environment. A bearer assignment component can receive network information, such as signal strength(s) and/or locations of the UEs in the environment, from UEs connected the first or second base stations. The bearer assignment component can determine, based on the network information, whether to assign a bearer to a UE attempting to connect to the first or second base station, and if so, a type of a bearer to assign to the UE. If similarly situated UEs experience a positive or negative outcome involving a bearer, the bearer assignment component can assign bearers to optimize communications between other UEs and the first or second base stations.

20 Claims, 6 Drawing Sheets

(51) Int. Cl.
  *H04W 48/20* (2009.01)
  *H04W 64/00* (2009.01)

(56) References Cited

U.S. PATENT DOCUMENTS

| | | | |
|---|---|---|---|
| 2015/0223084 A1* | 8/2015 | Lightstone | H04L 5/0048 370/252 |
| 2019/0007874 A1* | 1/2019 | Mildh | H04W 48/12 |
| 2019/0306906 A1* | 10/2019 | Huang | H04W 76/36 |

OTHER PUBLICATIONS

Wang et al., "Deep Learning-based Intelligent Dual Connectivity for Mobility Management in Dense Network", 2018 IEEE 88th Vehicular Technology Conference, IEEE, Aug. 27, 2018, pp. 1-5.

* cited by examiner

PREDICTIVE BEARER ASSIGNMENT FOR WIRELESS NETWORKS

BACKGROUND

Cellular communication devices use network radio access technologies to communicate wirelessly with geographically distributed cellular base stations. Long-Term Evolution (LTE) is an example of a widely implemented radio access technology that is used in $4^{th}$ Generation (4G) communication systems. New Radio (NR) is a newer radio access technology that is used in $5^{th}$ Generation (5G) communication systems. Standards for LTE and NR radio access technologies have been developed by the 3rd Generation Partnership Project (3GPP) for use by wireless communication carriers.

One architecture option, along with a suite of communication protocols and operations defined by the 3GPP, is referred to as EN-DC (Evolved Universal Terrestrial Radio Access Network (E-UTRAN)/New Radio-Dual Connectivity). EN-DC enables the simultaneous use of LTE and NR radio access technologies for communications between a mobile device and a cellular communication network, and may also be referred to as LTE/NR dual connectivity. EN-DC is described by 3GPP Technical Specification (TS) 37.340.

EN-DC can be implemented using a 4G core network supporting both LTE (4G) and 5G (NR) base stations, in a configuration known as Non-Standalone Architecture (NSA). In this configuration, a 4G LTE base station (referred to as a Master eNodeB or MeNB) is associated (e.g., via an X2 interface) with a 5G NR base station (referred to as a Secondary gNodeB or SgNB). In an NSA system, both the LTE base station and the NR base station are supported by a 4G core network. However, control communications are between the 4G core network and the LTE base station, and the LTE base station is configured to communicate with and to control the NR base station.

In an NSA system, a mobile device may initially connect to an LTE base station. Often, when the signal strength of an NR base station is above a threshold, the mobile device can connect to the NR base station. However, such an implementation using only this minimum level of decision-making reduces flexibility and may result in poor user experiences, as well as suboptimal network performance and use of resources, leading to increased operational costs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
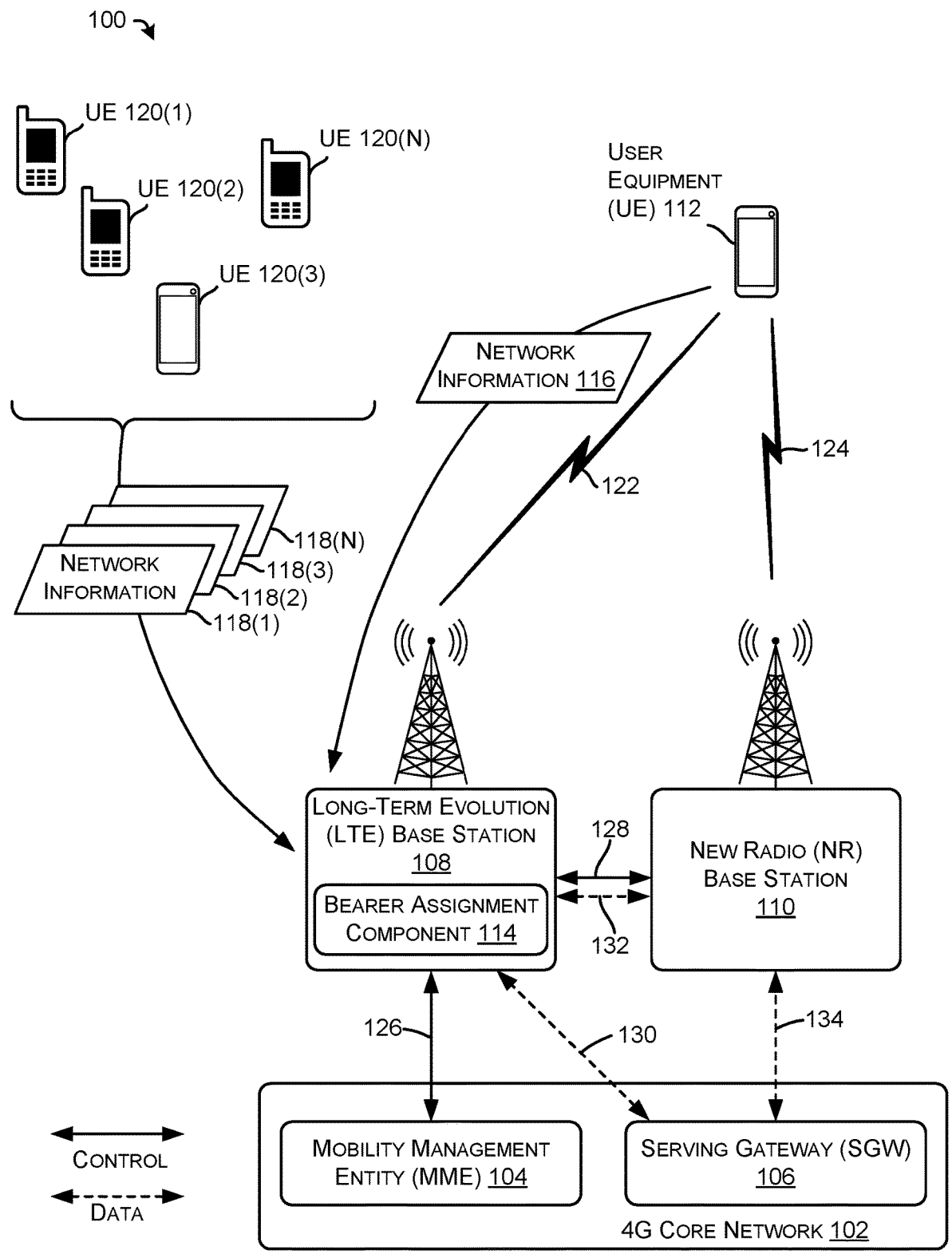
FIG. 1 illustrates an example environment including user equipment and various components implementing predictive bearer assignment, as described herein.

The systems, devices, and techniques described herein are directed to intelligent, predictive bearer assignment for wireless networks. In some instances, the wireless networks may include a master base station (e.g., a Long-Term Evolution (LTE) base station) that may operate in conjunction with a secondary base station (e.g., a New Radio (NR) base station) to provide dual connectivity to user equipment (UE) operating in that environment. A bearer assignment component can receive aggregated network information from a plurality of user equipments (UEs) connected to one or both of the LTE base station or the NR base station. Further, the bearer assignment component can receive network information from a UE that is connected to the LTE base station. The bearer assignment component can input the aggregated network information and the network information into a machine learning model that can determine whether to assign a bearer to the UE for a communication involving the NR base station. If the network information indicates that a UE that would be assigned a particular bearer type (discussed below) would be likely to receive a sub-optimal connection or drop the particular bearer type within a predetermined amount of time (e.g., connectivity likely to be lost due to expected limited geographic availability of NR coverage based on modeling information supplied by nearby UEs), the bearer assignment component may refrain from assigning the particular bearer to the UE, even if a signal strength indicates that the UE would support a 5G connection using the particular bearer type.

In general, a bearer can represent a pipeline connecting two or more points in a communication system through which data traffic or control traffic may travel. In some instances, bearer types may include, but are not limited to, one or more of a master cell group (MCG) bearer, a secondary cell group (SCG) bearer, an MCG split bearer or an SCG split bearer (referred to collectively as a split bearer), or an MCG bearer anchored on an SCG. In some examples, bearer types may further include a default EPS (Evolved Packet switched System) bearer, a dedicated bearer, radio bearer(s), and the like.

In some examples, the bearer assignment component can assign individual bearers to a UE (e.g., an MCG bearer and/or an SCG bearer) or can assign a split bearer to a UE (e.g., such that the UE is connected to the LTE base station and the NR base station and traffic is coordinated via a single bearer). Such a bearer assignment can be based at least in part on network information, which may include signal strength information (e.g., LTE signal strength, NR signal strength), location information (e.g., of individual UEs, which may be based on a beamforming lobe of base station(s)), and the like. In some instances, the bearer assignment can further assign a bearer based on load levels at base stations, a type of UE traffic (e.g., voice, data, etc.), latency requirements, a Quality of Service (QoS) Class Identifier (QCI), a QoS Flow Identifier (QFI), subscription level, and the like. Additionally, the network information can include indications that various UEs were assigned a 5G bearer (e.g., an SCG bearer or a split bearer) but were unable to attach to the NR base station or that the UE dropped the 5G bearer within a threshold amount of time, thus causing disruptions and/or delays in service (e.g., increasing the likelihood of a negative user experience). Thus, the bearer assignment component can incorporate a variety of network information into a determination of whether to assign a bearer to one or more UEs, thereby intelligently assigning bearers to UEs in the wireless network.

By way of example, a plurality of UEs can provide network information to the bearer assignment component. For example, a first UE of the plurality of UEs can provide location information of the first UE and LTE and/or NR signal strengths as determined by the first UE. Further, the first UE can provide a bearer history to the bearer assignment component indicating which bearers were assigned to the first UE and the various conditions associated with the first UE for each bearer (e.g., location, signal strength, time of bearer, traffic type, bandwidth, etc.). Next, a second UE can be initially connected to the LTE base station. The second UE can provide network information to the bearer assignment component, whereby such network information may include location information, LTE and/or NR signal strengths, traffic type, QoS and/or QCI, and the like. The bearer assignment component can input the network information associated with the first UE, the second UE, and/or the plurality of UEs into an algorithm such as a machine learning algorithm that is trained to determine whether, based on the network information associated with the second UE, and based on the network information associated with the first UE and/or the plurality of UEs, whether a bearer associated with a 5G communication (e.g., a 5G bearer) should be assigned to the second UE to provide an optimal connection and/or user experience to the UE. If, for example, the bearer assignment component predicts that the second UE will not receive a performance increase (e.g., increased bandwidth, reduced latency, higher signal strength, and the like) and/or predicts that the second UE will drop the 5G bearer within a threshold amount of time (e.g., due to incomplete network coverage), the bearer assignment may refrain from assigning a 5G bearer to the second UE despite the 5G signal otherwise supporting a connection.

The systems, devices, and techniques described herein can improve the intelligence of the function of bearer assignments in a network by providing a framework to assign bearers to user equipment based on a predictive outcome in order to improve user experience, as well as to optimize network operations and the use of network resources, lowering operational costs. For example, where a bearer assignment would not substantively improve a wireless communication or where a bearer assignment would likely be dropped quickly because of incomplete network coverage, the bearer assignment component discussed herein can refrain from assigning a bearer to user equipment. In some cases, refraining from assigning a bearer can reduce signaling between the UE and components of the network to set up the bearer which would otherwise be dropped. Further, refraining from assigning a bearer can avoid a situation where bearers are rapidly assigned and changed for a UE, which may introduce latency or even service disruption as various communications are routed through different base stations and/or network components. Thus, the systems, devices, and techniques described herein can conserve signaling bandwidth and/or prevent latency resulting from switching bearers. Further, incorporating network information from UEs in the field provides a flexible framework that can assign bearers based on accrued knowledge of actual outcomes rather than non-predictive, less flexible signal strength thresholds, for example. These and other improvements to the functioning of a computer and network are discussed herein.

The systems, devices, and techniques described herein can be implemented in a number of ways. In general, the techniques discussed herein may be implemented in any dual connectivity or multi connectivity environment, and are not limited to 2G, 3G, 4G, and/or 5G environments. In some examples, an LTE base station can be considered a master base station and an NR base station can be considered a secondary base station, and vice versa. In some instances, a core network can be represented as a 4G core network and/or a 5G core network. In some instances, the techniques can be implemented in standalone implementations (e.g., Option 1 and/or 2, as referred to by 3GPP) or in non-standalone implementations such as those referred to as Option 3, 4, 7, etc. by 3GPP. In some examples, the techniques discussed herein may be implemented outside a dual connectivity environment involving a single base station or network access technology and multiple bearers. Example implementations are provided below with reference to the following figures.

FIG. 1 illustrates an example environment including user equipment and various components implementing predictive bearer assignment, as described herein. The components shown in FIG. 1 may be used to implement dual connectivity, for use in a Non-Standalone Architecture (NSA) configuration, for example. When using NSA, a communication device may use both an LTE bearer and an NR bearer (or a split bearer, for example) for uplink and downlink transmissions to and from respective LTE and NR base stations, based on the bearer assignment(s), as discussed herein. In some instances, the LTE bearer can be used for control-plane messaging and for user-plane communications, while in some instances, the NR bearer can be used for additional user-plane bandwidth.

For purposes of discussion, a 4G or LTE component is a component that performs according to 4G or LTE communications standards. A 4G or LTE signal or communication is a signal or communication that accords with 4G or LTE communications standards. A 5G or NR component is a component that performs according to 5G or NR communications standards. A 5G or NR signal or communication is a signal or communication that accords with 5G or NR communications standards. A 4G bearer or LTE bearer is a bearer associated with a 4G connection or an LTE connection (e.g., a MCG bearer (where the LTE base station is the master base station)). A 5G bearer to NR bearer is a bearer associated with a 5G connection or an NR connection (e.g., an SCG bearer (where the NR base station is the secondary base station)). In some instances, a UE may be connected via a 4G connection and a 5G connection (e.g., via dual connectivity) via an individual 4G bearers and 5G bearers or via a split bearer (e.g., a MCG split bearer or an SCG split bearer). Although often discussed in the context of 4G and 5G environments, the techniques discussed herein may be implemented in any dual connectivity, multi connectivity, or multiple bearer environment.

The network 100 includes a 4G core network 102. Components of the 4G core network 102 that are relevant to this discussion include a Mobility Management Entity (MME) 104 and a Serving Gateway (SGW) 106. The MME 104 and the SGW 106 may be implemented in accordance with 3GPP 4G specifications.

Further, the 4G core network 102 can include a Packet Data Network (PDN) Gateway (PGW), a Home Subscriber Server (HSS), an Access Network Discovery and Selection Function (ANDSF), an evolved Packet Data Gateway (ePDG), a Data Network (DN), and the like.

In some examples, the core network 102 can include a 5G core network. For instance, the core network 102 may include any of an Access and Mobility management Function (AMF), a Session Management Function (SMF), a Policy Control Function (PCF), an Application Function (AF), an Authentication Server Function (AUSF), a Network Slice Selection Function (NSSF), a Unified Data Management (UDM), a Network Exposure Function (NEF), a Network Repository Function (NRF), a User Plane Function (UPF), a DN and the like.

FIG. 1 also shows a 4G LTE base station 108, a 5G NR base station 110, and user equipment (UE) 112.

The terms "user equipment (UE)," "user device," "wireless communication device," "wireless device," "communication device," "mobile device," and "client device," can be used interchangeably to describe any UE (e.g., the UE 112 and/or the UE 120, introduced below) that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology.

Examples of UEs (e.g., the UE 112 and/or the UE 120) can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

Any of the UEs 112 and 120 may be capable of supporting 4G radio communications, such as LTE radio communications, and 5G radio communications, such as New Radio (NR) communications. In some examples, either or both of UEs 112 and 120 may be configured to support at least one of enhanced Mobile Broadband (eMBB) communications, Ultra Reliable Low Latency Communications (URLLCs), or massive Machine Type Communications (mMTCs). In some instances, the one or more devices can include at least one device supporting one or more of a sensor network, voice services, smart city cameras, gigabytes-in-a-second communications, 3D video, 4K screens, work & play in the cloud, augmented reality, industrial and/or vehicular automation, mission critical broadband, or self-driving cars.

Further, the LTE base station 108 can include a bearer assignment component 114. In some instances, the bearer assignment component 114 can receive network information 116 associated with the UE 112. In some examples, the network information 116 can represent real-time or near real-time information about network resources and/or network conditions available to and/or associated with the UE 112. Further, the bearer assignment component 114 can receive a plurality of network information 118(1), 118(2), 118(3), . . . , 118(N) associated with UEs 120(1), 120(2), 120(3), . . . , 120(N), respectively. In some instances, the network information 118(1), 118(2), 118(3), . . . , 118(N) can be referred to collectively as the network information 118, and in some instances, the UEs 120(1), 120(2), 120(3), . . . , 120(N) can be referred to collectively as the UEs 120. In some examples, the network information 118 can represent real-time or near real-time information about network resources and/or network conditions available to and/or associated with the UE 120, respectively. The bearer assignment component 114 can determine whether to assign a bearer to the UE 112, and if so, what type of bearer to assign, based at least in part on the network information 116 and 118, and other factors, as discussed herein. In some instances, the bearer assignment component 114 can receive network information (e.g., real-time or near real-time information about network resources, load levels, bearer assignments, etc.) from other base stations in the network 100.

In some instances, the bearer assignment component 114 can assign a variety of bearer types that may include, but are not limited to, one or more of a master cell group (MCG) bearer, a secondary cell group (SCG) bearer, an MCG split bearer or an SCG split bearer (referred to collectively as a split bearer), or an MCG bearer anchored on an SCG. In the case where the LTE base station 108 is the master node, the MCG bearer can also be referred to as a 4G bearer. In the case where the NR base station 110 is the secondary node, the 5G bearer can correspond to the SCG bearer. In some instances, a UE may be connected via a 4G connection and a 5G connection (e.g., via dual connectivity) individually via a 4G bearer and a 5G bearer or via a split bearer (e.g., a MCG split bearer or an SCG split bearer). In some instances, signaling radio bearers can be assigned independently of or in conjunction with data radio bearers.

Although illustrated as residing in the LTE base station 108, the bearer assignment component 114 can be located in a standalone computing device or in any devices or components illustrated in the network 100.

Control plane communication channels between the base stations the components of the 4G core network (and additional components) are shown as solid lines. Data plane communication channels between the base stations and the components of the 4G core network are shown as dashed lines. Wired or wireless communications between the cellular communication device and the base stations are shown as lightning bolt symbols. Further, control plane and/or data plane communications may be transmitted and/or received via any wired or wireless transmission paths.

The LTE base station 108 and the NR base station 110 may in some cases be associated with each other by being co-located at a single cell site. Although only a single pair of base stations is shown in FIG. 1, the network 100 may include multiple cell sites, some of which might have both an LTE base station and an NR base station. In some instances, at least a portion of a geographic coverage area associated with the LTE base station 108 can overlap with a geographic coverage area associated with the NR base station 110.

The MME 104 functions as a control node for the 4G core network 102. For example, the MME 104 may facilitate idle mode, bearer activation and deactivation, serving gateway (SGW) selection, user authentication, and the like. In practice, a 4G core network may have multiple MMEs.

The SGW 106 functions as a communication gateway of the 4G core network 102. The SGW 106 is a data plane interface with the LTE and NR base stations 108 and 110, respectively. A 4G core network may have multiple SGWs.

The LTE base station 108 is configured in accordance with 4G LTE standards to communicate with devices using the LTE radio access technology. The NR base station 110 is configured in accordance with 5G NR standards to communicate with devices using NR radio access technology. An LTE base station is often referred to as an eNodeB. An NR base station is often referred to as a gNodeB. In some instances, the LTE base station 108 is not limited to LTE technology, and may be referred to generally as a first base station 108. In some instances, the NR base station 110 is not limited to NR technology, and may be referred to generally as a second base station 110. In some instances, depending on an implementation, the LTE base station 108 can be referred to as a master base station while the NR base station 110 can be referred to as a secondary base station. In some instances (e.g., in a MR-DC context), depending on an implementation (e.g., Option 4), the LTE base station 108 can be referred to as a secondary base station while the NR base station can be referred to as a master base station. In some instances, the LTE base station 108 and the NR base station may be referred to a base station 108 and a base station 110, respectively.

The UEs 112 and 120 may be one of many such devices that are configured for use within the network 100. The UEs 112 and 120 may comprise any of various types of cellular communication devices that are capable of wireless data and/or voice communications, including smart phones and other mobile devices, "Internet-of-Things" (IoT) devices, smart home devices, computers, wearable devices, entertainment devices, industrial control equipment, etc. In certain environments, the UEs 112 and 120 may be referred to as a computing device, a cellular communications device, or a mobile station (MS).

During a data communication session, the UE 112 can establish a primary LTE data connection 122 (via a 4G bearer) with the LTE base station 108 and/or a secondary NR data connection 124 (via a 5G bearer) with the NR base station 110. The primary LTE data connection 122 is a wireless communication channel that uses LTE radio access technology. The secondary NR data connection 124 is a wireless communication channel that uses NR radio access technology.

The network 100 can use a first control-plane communication channel 126 between the MME 104 and the LTE base station 108, and a second control-plane communication channel 128 between the LTE base station 108 and the NR base station 110. The network 100 can use a first data-plane communication channel 130 between the SGW 106 and the LTE base station 108, and a second data-plane communication channel 132 between the LTE base station 108 and the NR base station 110. Some implementations may also include a data-plane communication channel 134 between the SGW 106 and the NR base station 110. In some examples, the network 100 can include additional control-plane communication channels and/or data-plane communication channels, in addition to or instead of those illustrated in FIG. 1.

An example use case for bearer assignments in the dual connectivity network 100 is discussed. The UEs 120 can connect with the LTE base station 108 and/or the NR base station 110. The UEs 120 can provide the network information 118 to the bearer assignment component 114 informing the bearer assignment component 114 conditions of the UEs 120 and outcomes (in the form of successful/unsuccessful bearer addition(s), modification(s), termination(s), and the like) over time. The UE 112 can connect to the LTE base station 108 and the UE 112 can provide the network information 116 to the bearer assignment component 114 as well. The bearer assignment component 114 can comprise a machine learning algorithm or other heuristics, models, and/or algorithms to determine a similarity (and/or differences) between the network information 118 and the network information 116, and further can determine whether to assign a bearer to the UE 112 and/or what bearer type to assign to the UE 112. Accordingly, the bearer assignment component 114 can assign bearer(s) to UE(s) based on a predicted outcome of such an assignment. In some examples, the bearer assignment component 114 can assign bearer(s) to UE based on a confidence level associated with a predicted outcome being above a threshold level (e.g., such that there is a likelihood above a threshold level that a bearer will improve a communication).

In some instances, the bearer assignment component 114 can assign a 5G bearer to the UE 112 in addition to a 4G bearer assigned to the UE 112 (e.g., in a dual connectivity mode) or the bearer assignment component 114 can assign a 5G bearer to the UE 112 such that the UE 112 communicates with the NR base station 110 without being simultaneously connected to the LTE base station 108. In some instances, in a dual connectivity mode, the bearer assignment component 114 can determine whether to assign individual 4G and 5G bearers to a UE or to assign a split bearer for such connections.

In some examples, the bearer assignment component 114 can utilize the LTE base station 108 and the NR base station 110 simultaneously for a single communication or for multiple communications with the UE 112. For example, in some instances, uplink data or downlink data can be assigned independently to the LTE base station 108 or the NR base station 110. Further, in some examples, a first communication (e.g., a voice session) of the UE 112 can be handled by the LTE base station 108, while a second communication (e.g., a data session) can be handled by the NR base station 110. Of course, the examples are illustrative and are not intended to be limiting.

Although the UE 112 is described as communicating through a single cell site using both LTE and NR communications, it may be that in certain situations the LTE communications are through an LTE base station of a first cell site and the NR communications are through an NR base station of another cell site.

As may be understood, the network 100 may be implemented in accordance with any one of Option 3, 3a, 3x, 4, 4a, 7, 7a, and/or 7x, as defined by 3GPP. That is, the network 100 may include a 5G core and/or may include additional data-plane or control-plane signaling. In general, the techniques discussed herein may be implemented in any dual connectivity, multi connectivity, or multiple bearer environment.

Figure 2:
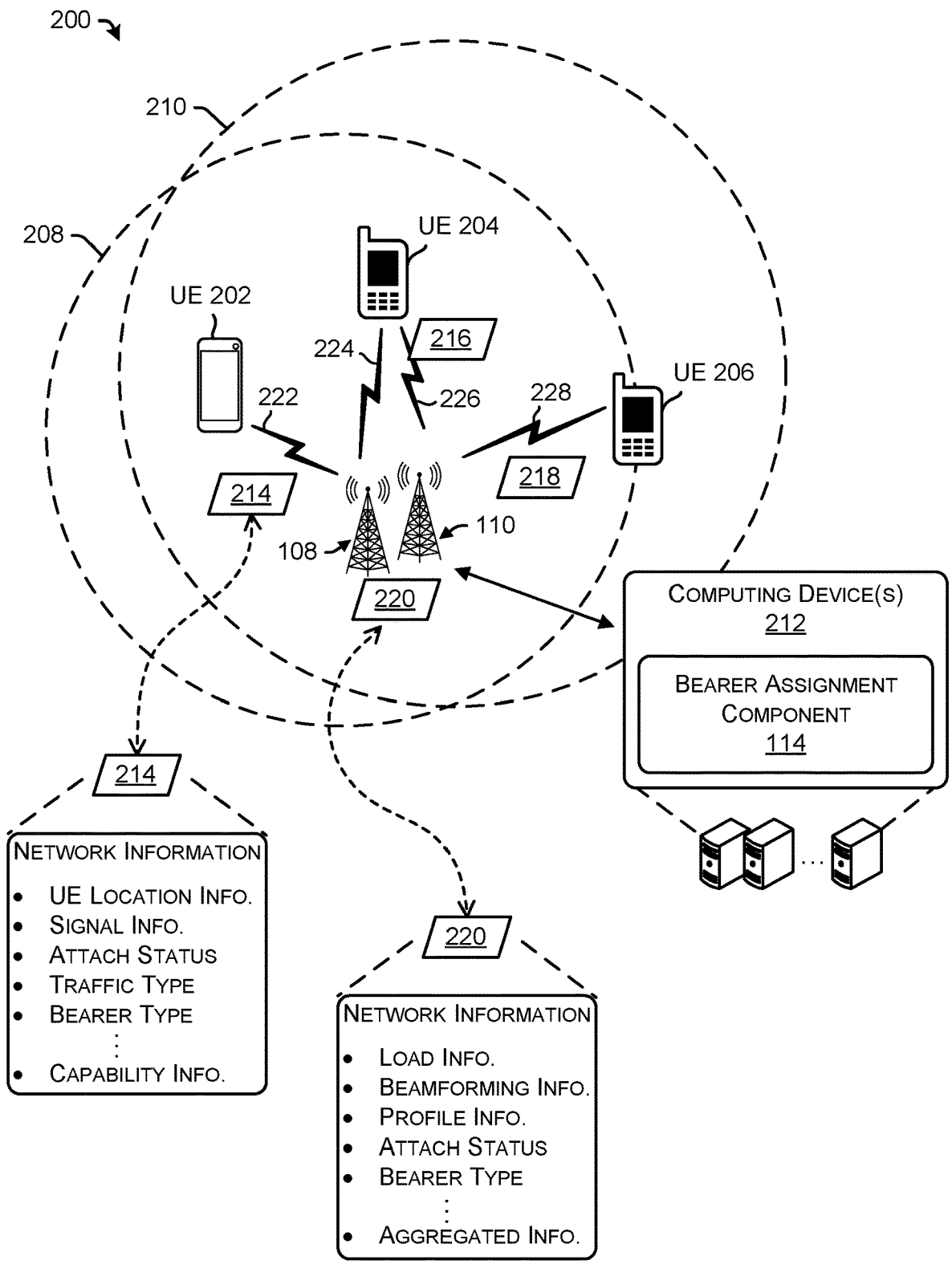
FIG. 2 illustrates an environment including bearer assignment(s) for a plurality of user equipment communicating in a dual connectivity network, based on network information and other factors, as described herein.

FIG. 2 illustrates an environment 200 including bearer assignment(s) for a plurality of user equipment communicating in a dual connectivity network, based on network information and other factors, as described herein. In some instances, the environment 200 can include a first UE 202, a second UE 204, and a third UE 206 capable of communicating with one or more of the LTE base station 108 and the NR base station 110.

The LTE base station 108 can be associated with a coverage area 208 and the NR base station 110 can be associated with a coverage area 210.

Further, the environment 200 can include computing device(s) 212, which may include the bearer assignment component 114. In some instances, the UE 202 can transmit network information 214 to the bearer assignment component 114 via one or both of the base stations 108 and 110 (or via any other base station). In some instances, the UE 204 can transmit network information 216 to the bearer assignment component 114 via one or both of the base stations 108 and 110 (or via any other base station). In some instances, the UE 206 can transmit network information 218 to the bearer assignment component 114 via one or both of the base stations 108 and 110 (or via any other base station). Additionally, in some instances, the base stations 108 and/or 110 can generate network information 220 to be sent to the bearer assignment component 114.

By way of example, and without limitation, the UE 202 can be attached (e.g., communicatively coupled) to the base station 108, as illustrated by a communication 222 (e.g., associated with a 4G bearer or a master cell group (MCG) bearer).

In some instances, the UE 204 can be attached to the base station 108 and 110, as illustrated by communication 224 and 226, respectively. In some instances, the communication 224 can be associated with a MCG bearer and the communication 226 can be associated with an SCG bearer. In some cases, the communications 224 and 226 can be associated with a split bearer, in which case a flow of traffic from the core network (e.g., the core network 102) can be received either by the base station 108 or 110 and can split (e.g., by a PDCP (Packet Data Convergence Protocol) protocol layer) such that packets can be split and sent via the base station 108 and/or 110 to the UE 204. In some cases, duplicate packets can be sent via the communications 224 and 226 to improve robustness or different packets can be sent via the communications 224 and 226 to increase bandwidth to the UE 204.

By way of example, and without limitation, the UE 206 can be attached to the base station 110, as illustrated by a communication 228 (e.g., associated with a 5G bearer or a secondary cell group (SCG) bearer).

As illustrated, the network information 214 can comprise various information regarding a state of network resources available to the UE 202. For example, and without limitation, the network information 214 can include: UE location information (e.g., GPS information, a beamforming lobe from the base station 108 associated with the communication 222, etc.); signal information (e.g., a strength of the signal from the base stations 108 and/or 110, such as a downlink signal strength such as a received signal strength indication (RSSI), reference signal received power (RSRP), reference signal received quality (RSRQ), signal-to-interference-plus-noise ratio (SINR), etc.); attach status (e.g., a history of any successful/unsuccessful connections with the base stations 108 and/or 110, such as one or more failed addition requests, or others); traffic type (e.g., QCI, application type, voice or data traffic, latency requirements, bandwidth requirements, etc.); bearer type (e.g., indicative of a bearer type assigned to the UE 202); capability information (e.g., whether the UE 202 is capable of dual connectivity and/or whether the UE 202 is capable of communicating via the 5G protocol, etc.); and the like.

As illustrated, the network information 220 can comprise various information regarding a state of network resources available at the base station 108 and/or 110. For example, and without limitation, the network information 214 can include: load information (e.g., a number of connections, available bandwidth, delay, queue size, jitter, etc. of the base station 108 and/or 110); beamforming information (e.g., indicative of individual beamforming lobe(s) associated with various UEs (e.g., indicative of location information)); profile information (e.g., a user profile based on an International Mobile Equipment Identity (IMEI), for example, received from various UEs, indicative of a subscriber level associated with UEs); attach status (e.g., a history of any successful/unsuccessful connections with the base stations 108 and/or 110, or others); bearer type (e.g., indicative of a bearer type assigned to the UEs); aggregated information (e.g., network information such as network information 214, 216, 218 received from UEs and aggregated or otherwise combined); and the like. In some instances, at least a portion of the network information 220 may be duplicative of at least a portion of the network information 214, 216, and/or 218. In some examples, multiple base stations (e.g., other base stations proximate to the base stations 108 and 110) can determine network information similar to or the same as the network information 220 and can provide such network information to the bearer assignment component 114.

In some examples, the bearer assignment component 114 can receive the various network information represented in the environment 200. In some instances, the network information (e.g., the network information 214, 216, 218, and/or 220) and an addition inquiry can be input into a machine learning algorithm that is trained to evaluate addition inquiries. That is, with respect to UE 202, for example, the bearer assignment component 114 can determine whether to add a communication between the UE 202 and the base station 110 and can determine a bearer type associated with the new communication channel (e.g., SCG bearer, split bearer, and the like).

In some instances, the bearer assignment component 114 can determine a similarity score between network information 214 provided by the UE 202 and aggregated network information. Based on a similarity score of UE conditions associated with positive outcomes (e.g., adding a bearer of a specific type resulting in a good quality of service, refraining from adding a bearer of a specific type resulting in a good quality of service, etc.) or negative outcomes (e.g., adding a bearer of a specific type resulting in a poor quality of service, refraining from adding a bearer of a specific type resulting in a poor quality of service, etc.), the bearer assignment component 114 can assign a bearer to the UE 202.

In some examples, the bearer assignment component 114 can include, but is not limited to, one or more of: neural network(s), convolutional neural network(s), recurrent neural network(s), linear regression algorithm(s), logistic regression algorithm(s), classification and regression tree algorithm(s), Naïve Bayes algorithm(s), K-nearest neighbors algorithm(s), learning vector quantization algorithm(s), support vector machine(s), bagging and random forest algorithm(s), boosting and Adaboost algorithm(s), and the like.

Figure 3:
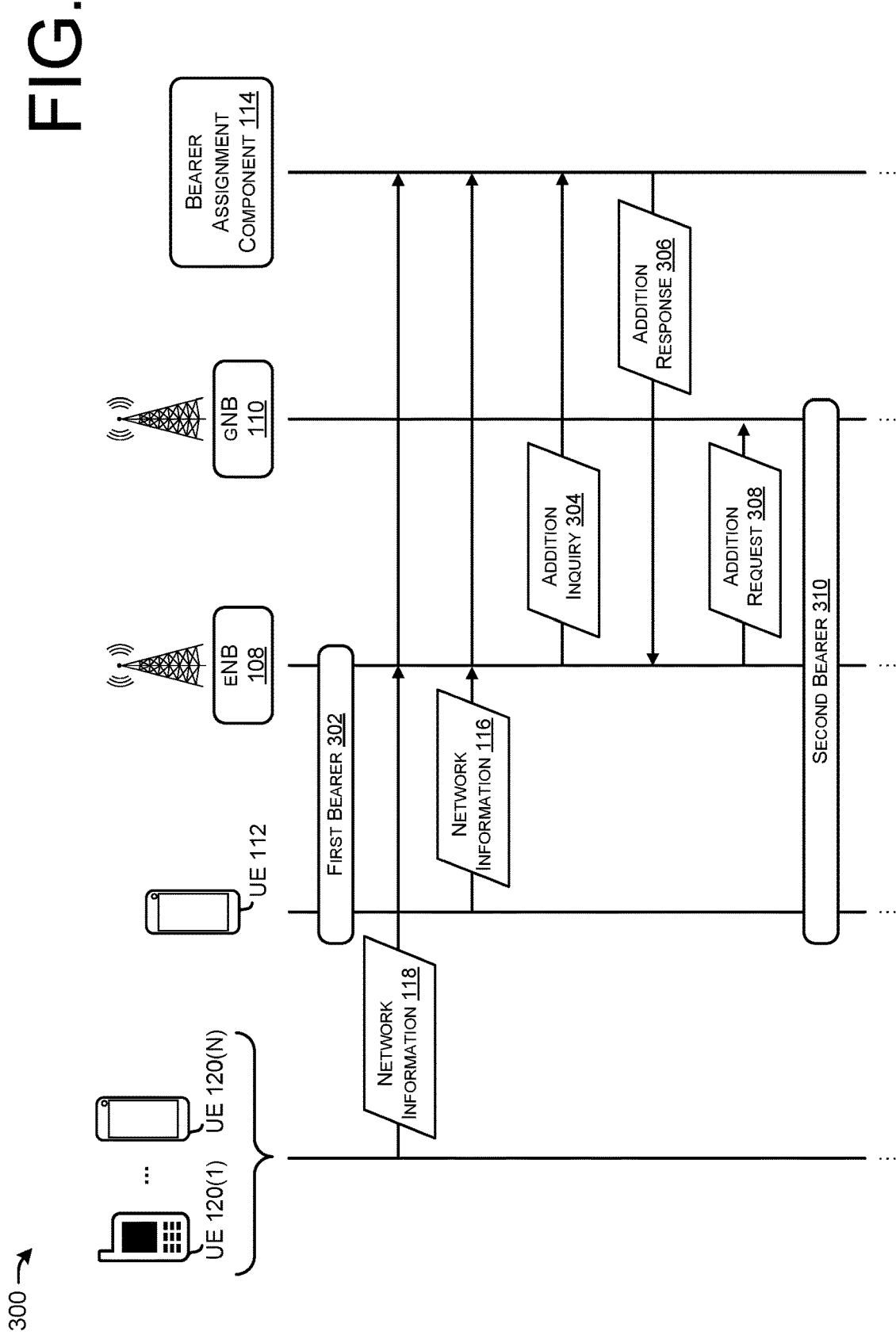
FIG. 3 is a diagram illustrating example signaling for predictive bearer assignment in a mobile network, as described herein.

FIG. 3 is a diagram 300 illustrating example signaling for predictive bearer assignment in a mobile network, as described herein. As can be understood, signals are illustrated by and between various components, with relative timing indicated by a vertical location of signals in the diagram.

In some instances, operations represented in the diagram can be performed by one or more of the UEs 120(1)-120(N), the UE 112, the LTE base station 108 (illustrated as the eNB 108), the NR base station 110 (illustrated as the gNB 110), and the bearer assignment component 114.

In some instances, the UE 112 can attach to the LTE base station 108 via a first bearer 302. In some instances, the first bearer may include a MCG bearer.

In some instances, the UEs 120(1)-120(N) (referred to as UEs 120) can send the network information 118 to the bearer assignment component 114. As discussed herein, the network information 118 can include signal information and/or location information associated with individual UEs of the UEs 120.

In some instances, the UE 112 can send the network information 116 to the bearer assignment component 114. As discussed herein, the network information 116 can include signal information and/or location information associated the UEs 112.

Next, and in some instances, the LTE base station 108 can send an addition inquiry 304 to the bearer assignment component 114. In some instances, the addition inquiry 304 can indicate to the bearer assignment component 114 to evaluate the network information 116 and 118 to determine whether to establish an additional bearer with the UE 112. At least partially in response to the addition inquiry 304, the bearer assignment component 114 can predict, based at least in part on the network information 116 and/or 118, whether assigning an additional bearer (e.g., an SCG bearer, a split bearer, and the like) to the UE 112 would result in a positive outcome. In some instances, a positive outcome may represent an improvement over a current connection with the UE 112 over a threshold improvement amount for a threshold amount of time.

In some instances, the bearer assignment component 114 can send an addition response 306 to the LTE base station 108. In some instances, the addition response 306 can indicate whether to assign a bearer to the UE 112, and if so, what particular bearer to assign.

At least partially in response to the addition response 306, the LTE base station 108 can transmit an addition request 308 to the NR base station instructing the NR base station to establish a second bearer 310 with the UE 112. In some instances, the addition request 308 can indicate a type of bearer to assign to the UE 112.

Figure 4:
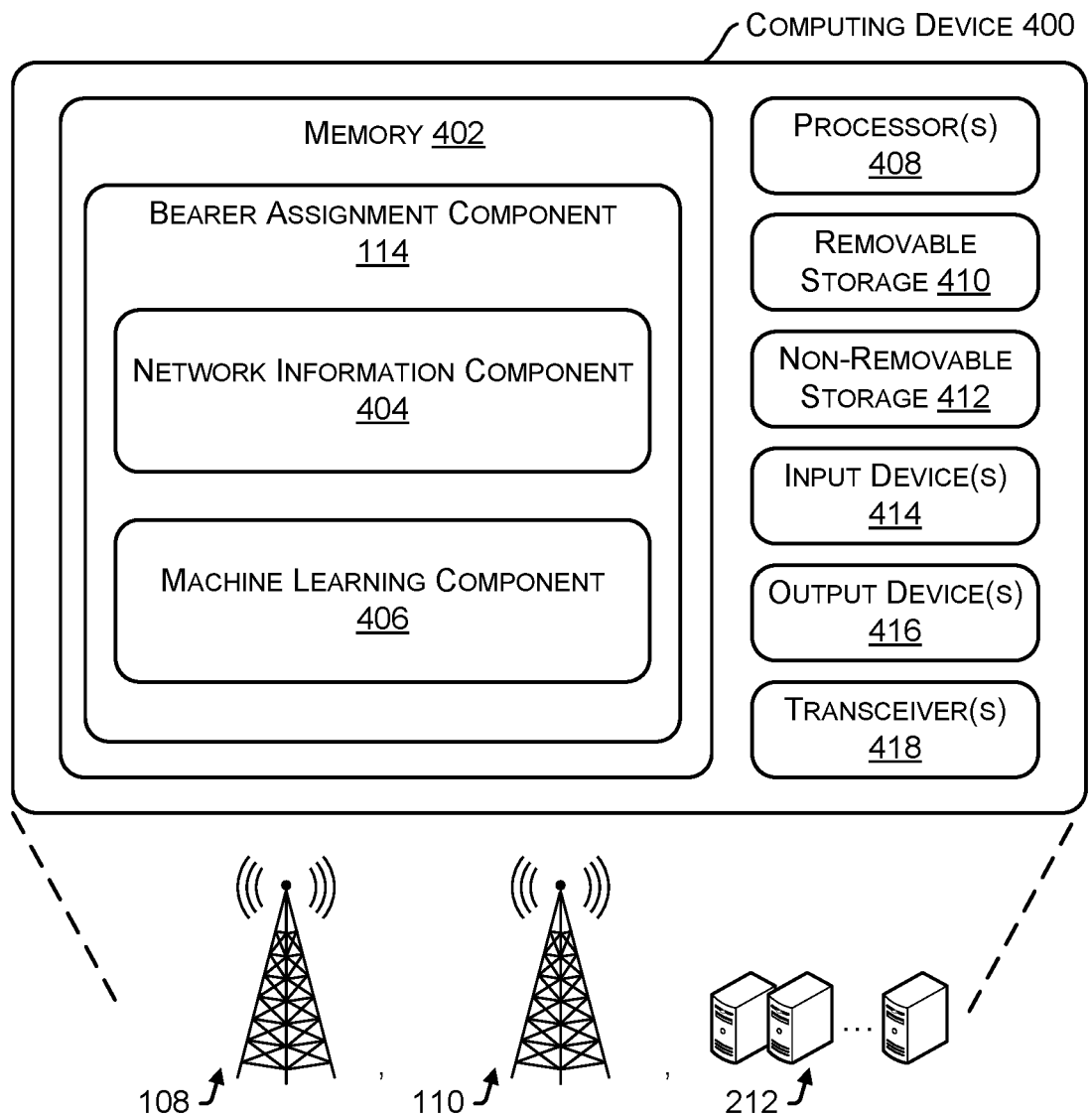
FIG. 4 illustrates an example computing device to implement the predictive bearer assignment, as described herein.

FIG. 4 illustrates an example computing device 400 to implement the predictive bearer assignment, as described herein. In some embodiments, the computing device 400 can correspond to the base stations 108 or 110 of FIG. 1, the MME 104 or SGW 106 of FIG. 1, and/or the computing device(s) 112 of FIG. 2. It is to be understood in the context of this disclosure that the computing device 400 can be implemented as a single device, as a plurality of devices, or as a system with components and data distributed among them.

As illustrated, the computing device 400 comprises a memory 402 storing the bearer assignment component 114 comprising a network information component 404 and a machine learning component 406. Also, the computing device 400 includes processor(s) 408, a removable storage 410 and non-removable storage 412, input device(s) 414, output device(s) 416, and transceiver(s) 418.

In various embodiments, the memory 402 is volatile (such as RAM), non-volatile (such as ROM, flash memory, etc.) or some combination of the two. The bearer assignment component 114, the network information component 404, and the machine learning component 406 stored in the memory 402 can comprise methods, threads, processes, applications or any other sort of executable instructions. The bearer assignment component 114, the network information component 404, and the machine learning component 406 can also include files and databases.

In general, and as described herein, the bearer assignment component 114, can receive and/or determine network information about network resources and can determine whether to assign a bearer to a UE, and if so, what bearer to assign. Aspects of the bearer assignment component 114 are discussed throughout this disclosure.

The network information component 404 can include functionality to determine and/or receive network information regarding devices associated with a network. For example, the network information component 404 can receive network information from UEs, base stations, and other devices or components in a network to determine a status of resources available in a network. In some examples, network information can be associated with specific locations of UEs in a network.

For example, the network information can include, but is not limited to: UE location information (e.g., GPS information, a beamforming lobe from a base station associated with the connection, information from other base stations to triangulate one or more UEs, etc.); signal information (e.g., a strength of the signal from one or more base stations, such as a downlink signal strength such as a received signal strength indication (RSSI), reference signal received power (RSRP), reference signal received quality (RSRQ), signal-to-interference-plus-noise ratio (SINR), etc.); attach status (e.g., a history of any successful/unsuccessful connections with one or more base stations); traffic type (e.g., associated with a UE communication, such as QCI, application type, voice or data traffic, latency requirements, bandwidth requirements, etc.); bearer type (e.g., indicative of a bearer type assigned to a UE); capability information (e.g., whether a UE is capable of dual connectivity and/or whether a UE is capable of communicating via the 5G protocol, etc.); and the like.

The network information determined and/or received by the network information component 404 can further include, but is not limited to: load information (e.g., a number of connections, available bandwidth, delay, queue size, jitter, etc. of the one or more base stations); beamforming information (e.g., indicative of individual beamforming lobe(s) associated with various UEs (e.g., indicative of location information)); profile information (e.g., a user profile based on an International Mobile Equipment Identity (IMEI), for example, received from various UEs, indicative of a subscriber level associated with UEs); attach status (e.g., a history of any successful/unsuccessful connections with one or more base stations); bearer type (e.g., indicative of a bearer type assigned to UEs); and the like.

The machine learning component 406 can include functionality to receive network information and to determine whether to assign a bearer to a UE based on a prediction of the outcomes of assigning or not assigning a bearer. In some instances, the machine learning component can include one or more machine learning algorithms that have been trained to evaluate addition requests (as discussed in FIG. 3) or requests to determine whether to add a bearer. In some instances, the machine learning component 406 can use network information aggregated from a first group of UEs (e.g., the UEs 120) as a ground truth for determining whether a UE (e.g. the UE 112) associated with particular network information should be assigned a bearer. In some instances, the machine learning component can include, but is not limited to, one or more of: neural network(s), convolutional neural network(s), recurrent neural network(s), linear regression algorithm(s), logistic regression algorithm(s), classification and regression tree algorithm(s), Naïve Bayes algorithm(s), K-nearest neighbors algorithm(s), learning vector quantization algorithm(s), support vector machine(s), bagging and random forest algorithm(s), boosting and Adaboost algorithm(s), and the like.

In some embodiments, the processor(s) 408 is a central processing unit (CPU), a graphics processing unit (GPU), or both CPU and GPU, or other processing unit or component known in the art.

The computing device 400 also includes additional data storage devices (removable and/or non-removable) such as, for example, magnetic disks, optical disks, or tape. Such additional storage is illustrated in FIG. 4 by removable storage 410 and non-removable storage 412. Tangible computer-readable media can include volatile and non-volatile, removable and non-removable media implemented in any method or technology for storage of information, such as computer readable instructions, data structures, program modules, or other data. The memory 402, the removable storage 410 and the non-removable storage 412 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the computing device 400. Any such tangible computer-readable media can be part of the computing device 400.

The computing device 400 may be configured to communicate over a telecommunications network using any common wireless and/or wired network access technology. Moreover, the computing device 400 may be configured to run any compatible device operating system (OS), including but not limited to, Microsoft Windows Mobile, Google Android, Apple iOS, Linux Mobile, as well as any other common mobile device OS.

The computing device 400 also can include input device(s) 414, such as a keypad, a cursor control, a touch-sensitive display, voice input device, etc., and output device(s) 416 such as a display, speakers, printers, etc. These devices are well known in the art and need not be discussed at length here.

As illustrated in FIG. 4, the computing device 400 also includes one or more wired or wireless transceiver(s) 418. For example, the transceiver(s) 418 can include a network interface card (NIC), a network adapter, a LAN adapter, or a physical, virtual, or logical address to connect to various networks, devices, or components illustrated in the network 100, for example. To increase throughput when exchanging wireless data, the transceiver(s) 418 can utilize multiple-input/multiple-output (MIMO) technology. The transceiver(s) 418 can comprise any sort of wireless transceivers capable of engaging in wireless, radio frequency (RF) communication. The transceiver(s) 418 can also include other wireless modems, such as a modem for engaging in Wi-Fi, WiMAX, Bluetooth, infrared communication, and the like.

Figure 5:
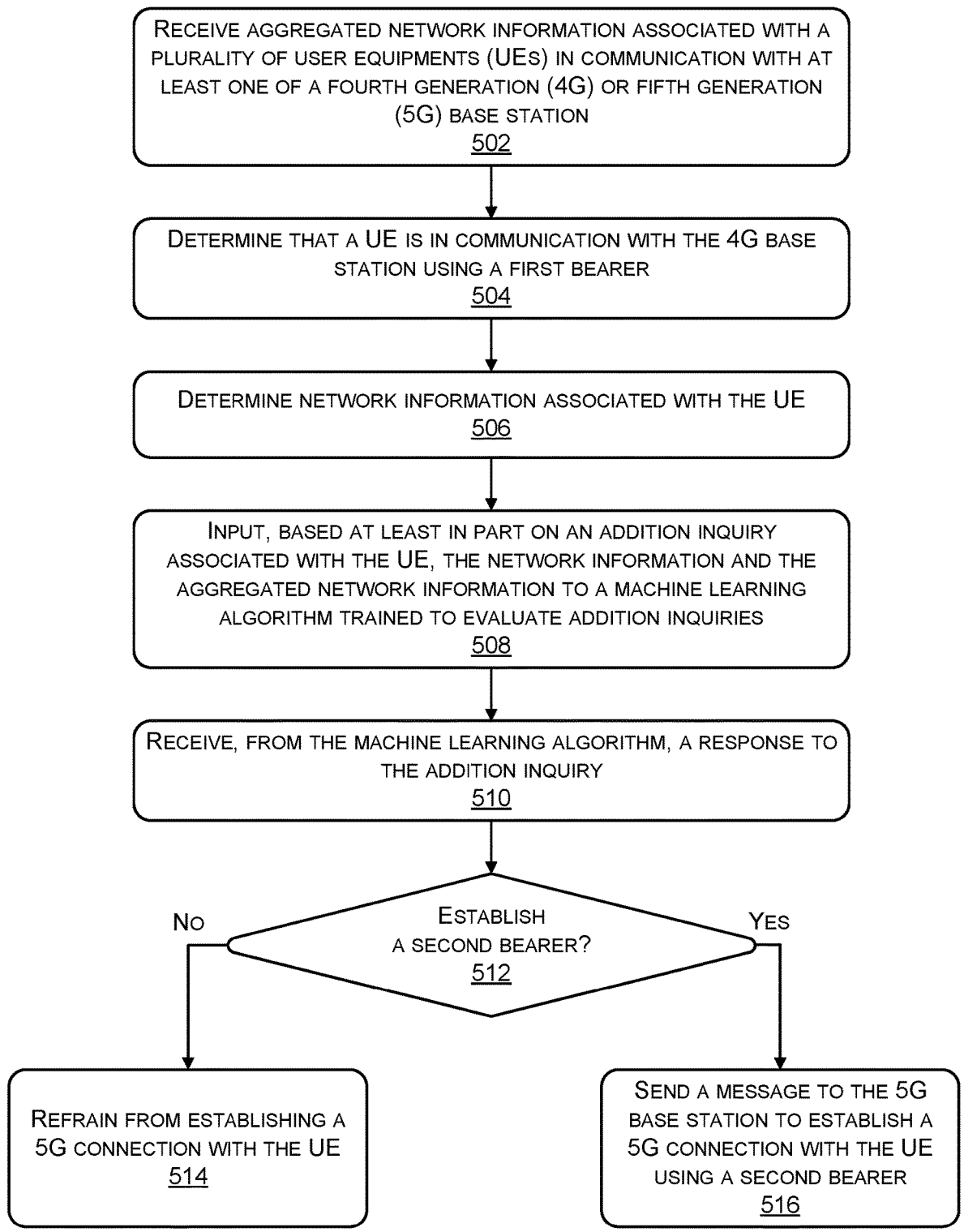
FIG. 5 illustrates an example process for determining whether to assign a bearer to a user equipment based on network information, as described herein.
Figure 6:
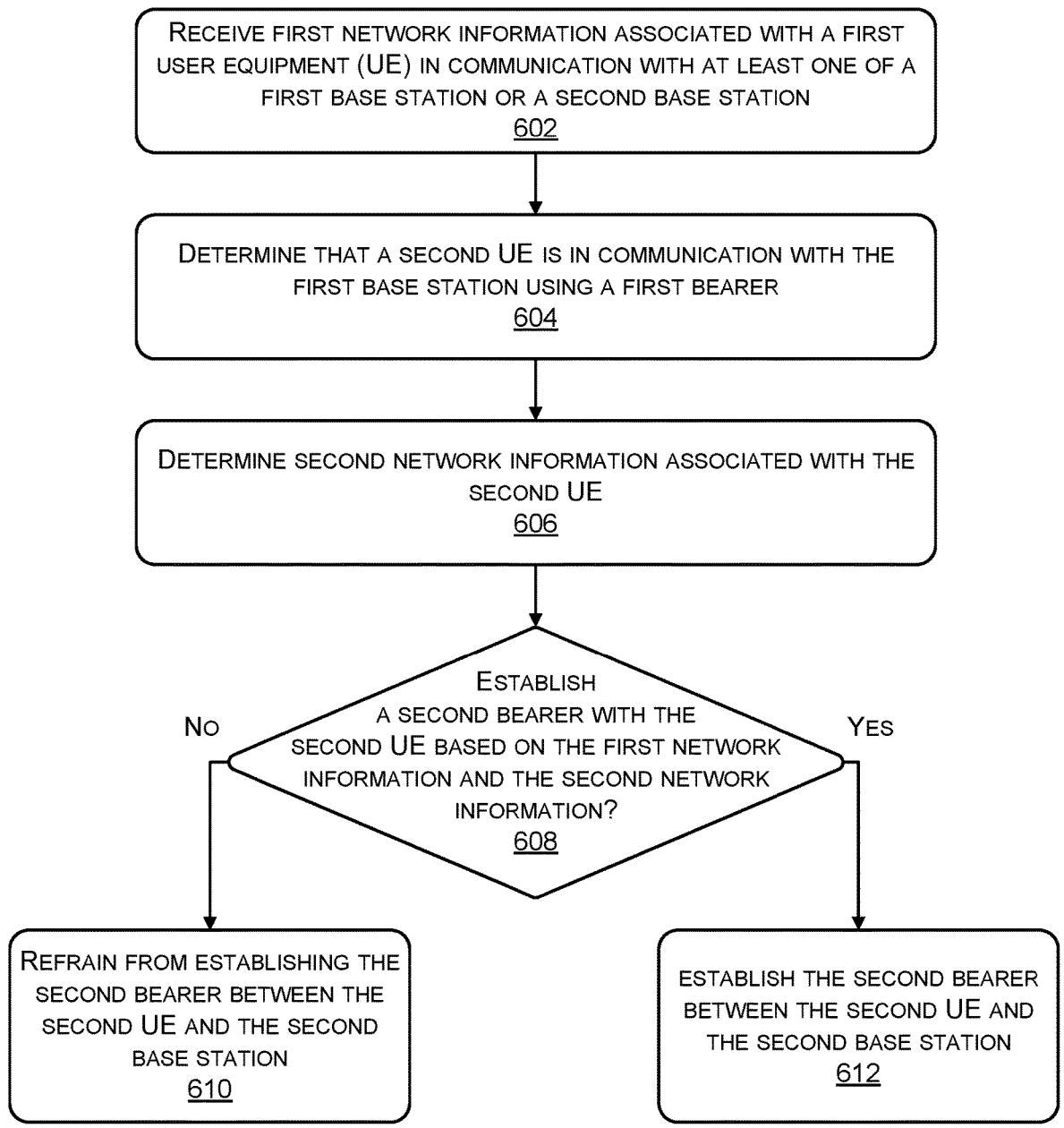
FIG. 6 illustrates another example process for determining whether to assign a bearer to a user equipment based on network information, as described herein.

FIGS. 5 and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for determining whether to assign a bearer to a user equipment based on network information, as described herein. The example process 500 can be performed by the bearer assignment component 114 (or another component), in connection with other components and/or devices discussed herein. Some or all of the process 500 can be performed by one or more devices or components in the network 100 or the environment 200, for example.

At operation 502, the process can include receiving aggregated network information associated with a plurality of user equipments (UEs) in communication with at least one of a fourth generation (4G) or fifth generation (5G) base station. For example, the operation 502 can include receiving or determining signal information, location information, and/or an indication of a communication as a positive or negative outcome. Examples of network information are discussed throughout this disclosure.

At operation 504, the process can include determining that a UE is in communication with the 4G base station using a first bearer. For example, the first bearer can include a MCG bearer.

At operation 506, the process can include determining or receiving network information associated with the UE. For example, the network information can include location information and/or signal information as measured by the UE, although additional examples of network information are discussed throughout this disclosure.

At operation 508, the process can include inputting, based at least in part on an addition inquiry associated with the UE, the network information and the aggregated network information to a machine learning algorithm trained to evaluate addition inquiries. In some instances, the addition inquiry can be received from a base station or other device to initiate the process to assess network resources available to the UE to determine whether to assign, add, or otherwise modify a bearer associated with the UE.

At operation 510, the process can include receiving, from the machine learning algorithm, a response to the addition inquiry. For example, the response can include an indication of whether a bearer should be added or modified, and if so, a type of bearer to establish for the UE.

At operation 512, if the response indicates that a second bearer should not be established (e.g., the response denies the addition inquiry), the process can continue to operation 514, wherein the process includes refraining from establishing an additional bearer with the UE. In some cases, the UE may maintain a communication via the first bearer. In some examples, the operations 512 and 514 can collectively provide functionality to determine that the response denies the addition inquiry and to refrain from establishing a 5G connection with the UE.

At operation 512, if the response indicates that a second bearer should be established (e.g., the response approves the addition inquiry), the process can continue to operation 516, wherein the process includes sending a message to the 5G base station to establish a 5G connection with the UE using a second bearer. For example, the message may include an addition request from the 4G base station (or MME) to the 5G base station. In some instances, the second bearer may be an SCG bearer or a split bearer. In some instances, the operation 516 may include establishing a dual connectivity connection or a 5G connection without an attachment to the 4G base station. In some examples, the operations 512 and 516 can collectively provide functionality to determine that the response approves the addition inquiry and to send a message to the 5G base station to establish a 5G connection with the UE using a second bearer.

FIG. 6 illustrates another example process 600 for determining whether to assign a bearer to a user equipment based on network information, as described herein. The example process 600 can be performed by the bearer assignment component 114 (or another component), in connection with other components and/or devices discussed herein. Some or all of the process 500 can be performed by one or more devices or components in the network 100 or the environment 200, for example.

At operation 602, the process can include receiving first network information associated with a first user equipment (UE) in communication with at least one of a first base station or a second base station. For example, the operation 602 can include receiving or determining signal information, location information, and/or an indication of a communication as a positive or negative outcome. Examples of network information are discussed throughout this disclosure.

At operation 604, the process can include determining that a second UE is in communication with the first base station using a first bearer. For example, the first bearer can include a MCG bearer. In some examples, the operation 604 can also include that the second UE is requesting data or a communication type that exceeds the capabilities of the first bearer. For example, the second UE can be attempting a high data video call (e.g., an a 4K streaming video call, MPEG-4 video, etc.), an ultra low latency communication (e.g., an Ultra Reliable Low Latency Communication (URLLC)), and the like, in which case a second bearer might provide a better experience than the first bearer.

At operation 606, the process can include determining second network information associated with the second UE. For example, the network information can include location information and/or signal information as measured by the UE, although additional examples of network information are discussed throughout this disclosure.

At operation 608, the process can include determining whether to establish a second bearer with the second UE based on the first network information and the second network information. In some examples, the operation 608 can include inputting the network information into a machine learning algorithm. In some instances, the operation 608 can use rules (e.g., a decision tree) or other heuristics to determine whether to establish a second bearer with the second UE.

If the operation 608 determines not to establish a second bearer, the process can continue to operation 610, wherein the process includes refraining from establishing the second bearer between the second UE and the second base station. In some cases, the second UE may maintain a communication via the first bearer.

If the operation 608 determines to establish a second bearer, the process can continue to operation 612, wherein the process includes establishing the second bearer between the second UE and the second base station. In some instances, the second bearer may be an SCG bearer or a split bearer. In some instances, the operation 608 may include establishing a dual connectivity connection with the first base station and the second base station or a connection to the second base station without an attachment to the first base station.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a memory; and
one or more components stored in the memory and executable by the one or more processors to perform operations comprising:
receiving, at a Fourth Generation (4G) base station, aggregated network information associated with a plurality of user equipments (UEs) in communication with at least one of the 4G base station or a Fifth Generation (5G) base station, wherein the aggregated network information comprises at least signal strength information and location information associated with the plurality of UEs;
determining that a UE is communicating with the 4G base station using a first bearer;
determining network information associated with the UE;
inputting, based at least in part on an addition inquiry associated with the UE, the network information and the aggregated network information to a machine learning algorithm trained to evaluate addition inquiries;
receiving, from the machine learning algorithm, a response to the addition inquiry, the machine learning algorithm trained to determine the response at least partially based on a likelihood that, if a 5G connection is established, the UE will be dropped by the 5G base station within a threshold amount of time; and
performing one of:
determining that the response denies the addition inquiry and refraining from establishing a 5G connection with the UE; or
determining that the response approves the addition inquiry and sending a message to the 5G base station to establish a 5G connection with the UE using a second bearer, wherein the UE is connected to both the 4G base station via the first bearer and the 5G base station via the second bearer at a same time.

2. The system of claim 1, wherein the location information associated with the plurality of UEs is based at least in part on a beamforming lobe associated with the 4G base station or the 5G base station to connect with individual ones of the plurality of UEs.

3. The system of claim 1, wherein the performing comprises determining that the response approves the addition inquiry, and wherein the addition inquiry is indicative of a bearer type associated with the 5G connection.

4. The system of claim 1, wherein the first bearer or the second bearer is a bearer type selected from a plurality of bearer types, wherein the plurality of bearer types comprises one or more of:
   a master cell group (MCG) bearer;
   a secondary cell group (SCG) bearer;
   an MCG split bearer;
   an SCG split bearer; or
   an MCG bearer anchored on an SCG.

5. The system of claim 1, wherein the network information further comprises information indicative of one or more failed addition requests associated with the 5G base station.

6. A system comprising:
   one or more processors;
   a memory; and
   one or more components stored in the memory and executable by the one or more processors to perform operations comprising:
      receiving, at a computing device, first network information associated with a first user equipment (UE) connected to at least one of a first base station or a second base station, wherein the first network information comprises at least one of signal strength information or location information;
      determining that a second UE is connected to the first base station using a first bearer;
      determining second network information associated with the second UE;
      inputting, based at least in part on an addition inquiry associated with the second UE, the first network information and the second network information to a machine learning algorithm trained to evaluate addition inquiries;
      receiving, from the machine learning algorithm, a response to the addition inquiry, the machine learning algorithm trained to determine the response at least partially based on a likelihood that, if a second bearer is established between the second base station and the second UE, the second UE will be dropped by the second base station within a threshold amount of time; and
      performing, based at least in part on the response, one of:
         refraining from establishing a second bearer between the second base station and the second UE; or
         establishing a second bearer between the second base station and the second UE, wherein the second UE is connected to both the first base station via the first bearer and the second base station via the second bearer at a same time.

7. The system of claim 6, wherein:
   the first base station is a Fourth Generation (4G) base station; and
   the second base station is a Fifth Generation (5G) base station.

8. The system of claim 6, wherein:
   the first base station is a Fifth Generation (5G) base station corresponding to a master base station; and
   the second base station is a Fourth Generation (4G) base station corresponding to a secondary base station.

9. The system of claim 6, wherein the signal strength information comprises at least one of:
   a first indication of a first strength of a first signal received by the first UE from the first base station; or
   a second indication of a second strength of a second signal received by the first UE from the second base station.

10. The system of claim 6, wherein the location information comprises at least one of:
    a first beamforming lobe providing a first connection between the first UE and the first base station; or
    a second beamforming lobe providing a second connection between the first UE and the second base station.

11. The system of claim 6, wherein the second network information comprises:
    location information of the second UE; and
    signal strength information of a signal received by the second UE from the second base station.

12. The system of claim 6, wherein the first bearer comprises at least one of:
    a master cell group (MCG) bearer;
    an MCG split bearer; or
    an MCG bearer anchored on a secondary cell group (SCG).

13. The system of claim 6, wherein the second bearer comprises at least one of:
    a secondary cell group (SCG) bearer;
    an SCG split bearer; or
    a master cell group (MCG) bearer anchored on an SCG.

14. The system of claim 6, wherein the computing device is the first base station or a Mobility Management Entity (MME) node in a Fourth Generation (4G) core network.

15. A processor-implemented method comprising:
    receiving, at a computing device, first network information associated with a first user equipment (UE) in communication with at least one of a first base station or second base station, wherein the first network information comprises at least one of signal strength information or location information;
    determining that a second UE is communicating with the first base station using a first bearer;
    determining second network information associated with the second UE;
    inputting, based at least in part on an addition inquiry associated with the second UE, the first network information and the second network information to a machine learning algorithm trained to evaluate addition inquiries;
    receiving, from the machine learning algorithm, a response to the addition inquiry, the machine learning algorithm trained to determine the response at least partially based on a likelihood that, if a second bearer is established between the second base station and the second UE, the second UE will be dropped by the second base station within a threshold amount of time;
    performing, based at least in part on the response, one of:
       refraining from establishing a second bearer between the second base station and the second UE; or
       establishing a second bearer between the second base station and the second UE, wherein the second UE is connected to both the first base station via the first bearer and the second base station via the second bearer at a same time.

16. The processor-implemented method of claim 15, wherein:
    the first base station is a Long-Term Evolution (LTE) base station; and
    the second base station is a New Radio (NR) base station.

17. The processor-implemented method of claim 15, wherein:
    the signal strength information comprises at least one of:
       a first indication of a first strength of a first signal received by the first UE from the first base station; or a second indication of a second strength of a second signal received by the first UE from the second base station; and the location information comprises at least one of:
a first beamforming lobe providing a first connection between the first UE and the first base station; or
a second beamforming lobe providing a second connection between the first UE and the second base station.

18. The processor-implemented method of claim 15, wherein the second network information comprises:
location information of the second UE; and
signal strength information of a signal received by the second UE from the second base station.

19. The processor-implemented method of claim 15, wherein the first bearer or the second bearer is a bearer type selected from a plurality of bearer types, wherein the plurality of bearer types comprises one or more of:
a master cell group (MCG) bearer;
a secondary cell group (SCG) bearer;
an MCG split bearer;
an SCG split bearer; or
an MCG bearer anchored on an SCG.

20. The processor-implemented method of claim 15, wherein the computing device is the first base station.

* * * * *